United States Patent [19]

Fierheller

[11] Patent Number: 5,321,600
[45] Date of Patent: Jun. 14, 1994

[54] DELTA CONNECTED THREE PHASE AC-DC CONVERTER WITH POWER FACTOR CORRECTION CIRCUITS

[75] Inventor: Ernest M. Fierheller, Placentia, Calif.
[73] Assignee: Hughes Aircraft Company, Los Angeles, Calif.
[21] Appl. No.: 966,231
[22] Filed: Oct. 26, 1992
[51] Int. Cl.$^5$ ............................................. H02M 7/08
[52] U.S. Cl. ...................................... 363/65; 363/81; 363/89
[58] Field of Search ...................... 363/65, 70, 80, 81, 363/89

[56] References Cited

U.S. PATENT DOCUMENTS

| 4,386,394 | 5/1983 | Kocher et al. | 363/20 |
| 4,509,108 | 4/1985 | Gallios | 363/45 |
| 4,680,689 | 7/1987 | Payne et al. | 363/26 |
| 5,003,453 | 3/1991 | Tighe et al. | 363/65 |

FOREIGN PATENT DOCUMENTS 59-198873  10/1984  Japan .................................. 363/89

OTHER PUBLICATIONS

Marple, "Low Distortion Three-Phase Power Regulator," vol. 22, No. 3, pp. 970, 1, Aug. 1979.
"Design of a 1kW Power Factor Correction Circuit"; by M. K. Nalbant, et al., Power Conversion and Intelligent Motion, Jul. 1990, pp. 17–24.
Micro Linear Preliminary Specification for the ML4812 Power Factor Controller, Sep. 1989.
"Active Power Factor Correction Technique"; M. K. Nalbant & A. Koblinski; Micro Linear Application Note 9, Sep. 1989.
Unitrode Load Share Controller Specification, Aug. 1991.

Primary Examiner—William H. Beha, Jr.
Attorney, Agent, or Firm—W. K. Denson-Low

[57] ABSTRACT

A three phase power conditioner. The inventive power conditioner (10) converts an alternating current input signal from a three phase source (12) into a direct current output signal and includes a first circuit (20) for converting a first phase of the input signal into a first direct current output signal. A second circuit (22) is included for converting a second phase of the input signal into a second direct current output signal. Likewise, a third circuit (24) converts a third phase of the input signal into a third direct current output signal. A control circuit (30) regulates the power supplied by the first, second and third circuits to balance the loads (26) for all load values dynamically. In an illustrative implementation, the first, second and third circuits (20, 22, and 24) are implemented with boost converters and the controller (30) is implemented with a load share controller. The inventive power conditioner is adapted for use with Wye and Delta configured three phase power sources.

3 Claims, 5 Drawing Sheets

1

DELTA CONNECTED THREE PHASE AC-DC CONVERTER WITH POWER FACTOR CORRECTION CIRCUITS

BACKGROUND OF THE INVENTION

1. Field of the Invention:

The present invention relates to power supplies. More specifically, the present invention relates to power conditioners for use in power supplies.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art:

Power supply circuits typically include a rectifier circuit which converts an input alternating current (AC) input waveform to a direct current (DC) waveform. These rectifiers often pull harmonic currents from the source along with the desired fundamental signal. The harmonics impede the efficiency of power conversion and induce noise in load circuits.

For example, high power 3 phase AC to DC converters typically use off-line rectifies. Diodes or silicon controlled rectifiers (SCRs) control the rectification process by controlling the ON time of the rectifier. The output is smoothed or filtered by a large capacitor which provides a low ripple DC bus voltage for power distribution, motor control, lighting and etc. The circuit pulls harmonic currents which do not convert to work and are considered lost energy. The quality factor of the harmonic content is the "power factor". The power factor of typical high power rectifiers is 0.6 to 0.7. This translates to 30–40% usable power lost in the rectification process.

U. S. Pat. No. 4,680,689, issued Jul. 14, 1987, to Payne et. al. describes a three-phase AC to DC power converter which employs a separate DC to DC converter on each phase connected in parallel to reduce harmonic currents. Unfortunately, the DC to DC converters share the DC load current without regulation. Therefore, for example, if the load was one third the maximum level, the output impedance of each DC to DC converter would have to be exactly matched to provide equal sharing. Since there cannot be an exact match because of device and manufacturing tolerances, the lowest source impedance would dominate the DC load and cause an unbalanced load at the power source. In a four wire system, the imbalance would be in the neutral wire which could cause a safety hazard by overloading the neutral wire causing excessive voltage drop or difference between adjacent equipment.

Thus, there is a need in the art for a technique for converting alternating current to direct current at all power levels with a high power factor and minimal harmonic currents.

SUMMARY OF THE INVENTION

The need in the art is addressed by the three phase power conditioner of the present invention. The inventive power conditioner converts an alternating current input signal from a three phase source into a direct current output signal and includes a first circuit for converting a first phase of the input signal into a first direct current output signal. A second circuit is included for converting a second phase of the input signal into a second direct current output signal. Likewise, a third circuit converts a third phase of the input signal into a third direct current output signal. A control circuit regulates the power supplied by the first, second and third circuits to balance the loads for all load values dynamically.

In an illustrative implementation, the first, second and third circuits are implemented with boost converters and the controller is implemented with a load share controller. The inventive power conditioner is adapted for use with Wye and Delta configured three phase power sources.

DESCRIPTION OF THE INVENTION

Illustrative embodiments and exemplary applications will now be described with reference to the accompanying drawings to disclose the advantageous teachings of the present invention.

Figure 1:
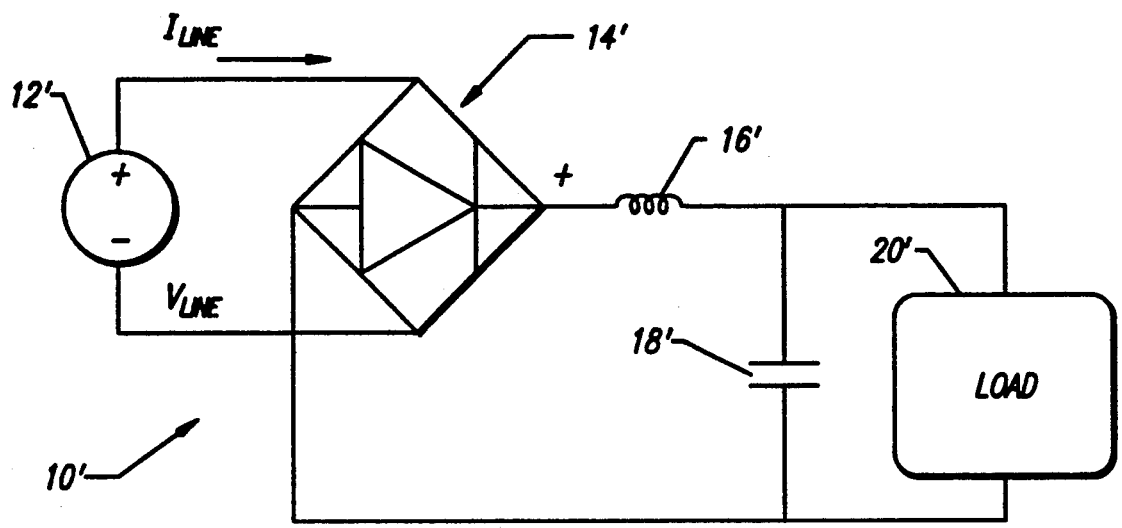
FIG. 1 is a simplified diagram of a typical rectifier circuit.

FIG. 1 is a simplified diagram of a typical rectifier circuit. The rectifier 10' is connected to a voltage source 12'. The rectifier 10' includes a bridge rectifier 14' with inputs connected to the voltage source 12' and outputs connected across a load 20'. An optional inductive element 16' is connected in series with one of the outputs of the rectifier 14'. A capacitor 18' is connected across the load 20'.

Figure 2:
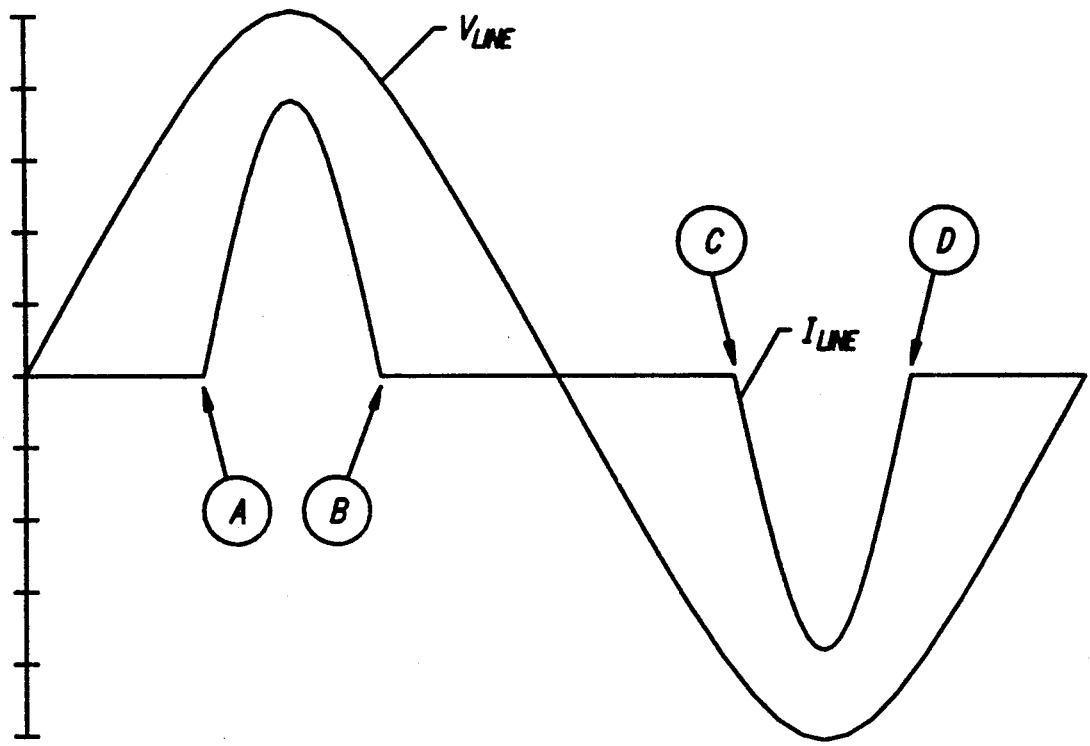
FIG. 2 is a graph of the voltage and current output by the typical rectifier circuit of FIG. 1.

FIG. 2 is a graph of the voltage and current input by the typical rectifier circuit of FIG. 1. As the voltage from the source 12' increases in a sinusoidal manner, the current remains at zero until the voltage exceeds the negative bias applied to the diodes of the rectifier circuit due to a residual charge on the capacitor 18'. When the rectifier circuit 14' is forward biased, current flows in the load 20' until the charge on the capacitor 18' equals the voltage across the rectifier circuit 14' due to the voltage source 12'. At this point, the current drops again to zero. This phenomenon repeats on the negative half cycle. The current steps at points A, B, C and D include undesirable harmonics as discussed more fully above. That is, Fourier components are significant in the heavily distorted current waveform.

Figure 3:
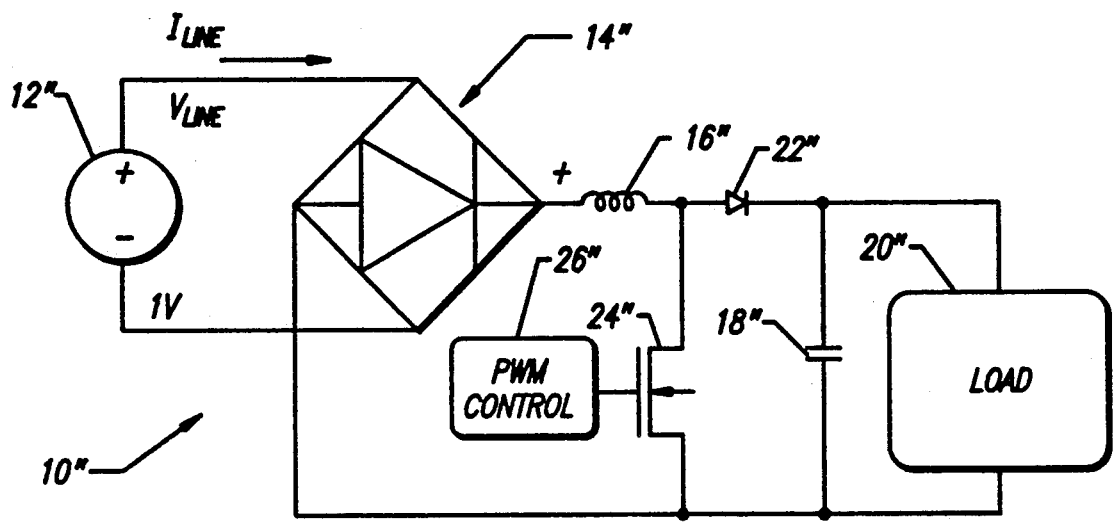
FIG. 3 is a simplified diagram of a conventional boost converter with power factor correction which offers some improvement in performance over the typical rectifier circuit of FIG. 1.

FIG. 3 is a simplified diagram of a conventional boost converter with power factor correction which offers some improvement in performance over the typical rectifier circuit of FIG. 1. The boost converter 10" is similar to the typical rectifier circuit of FIG. 1 with the exception of: 1) a diode 22" between the inductor 16" and the load 20" and 2) a switch 24" implemented with a metal-oxide semiconductor field-effect transistor controlled by a pulse width modulator circuit 26".

Figure 4:
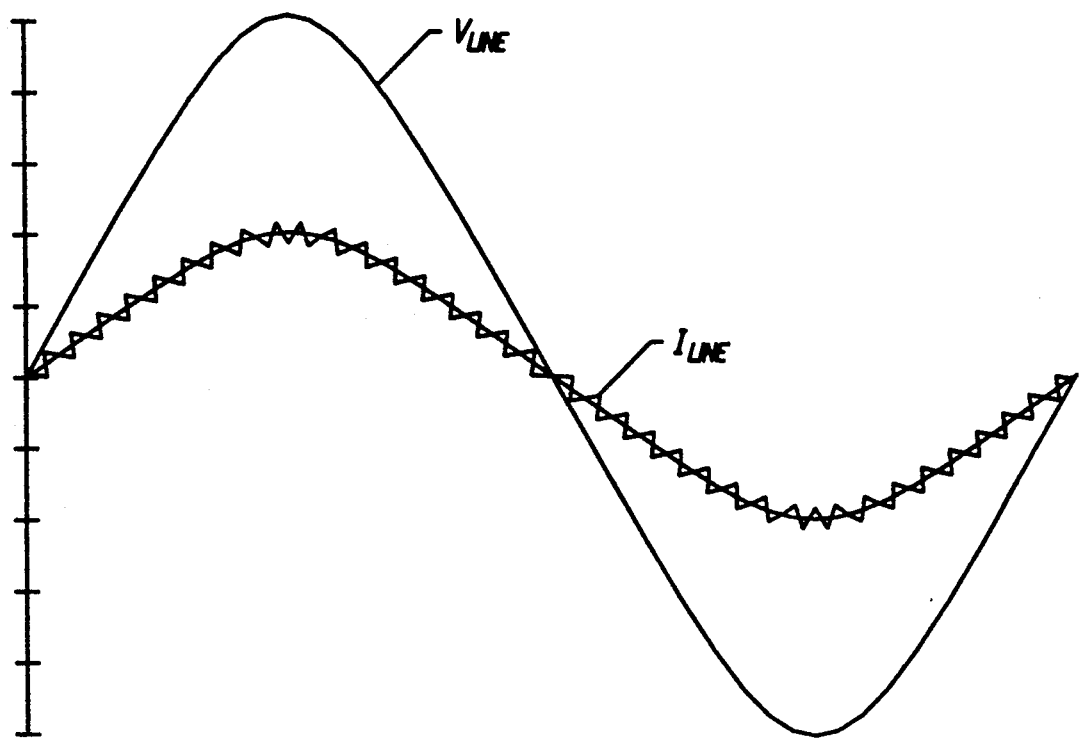
FIG. 4 illustrates the voltage and current waveforms of the boost converter of FIG. 3.

FIG. 4 illustrates the voltage and current input waveforms of the boost converter of FIG. 3. Note that the discontinuities in the current waveform may be eliminated by this design. Unfortunately, the boost converter of FIG. 3 is essentially a single phase design that would not operate in a three phase system.

As mentioned above, U.S. Pat. No. 4,680,689, issued Jul. 14, 1987, to Payne et. al. describes a three-phase AC to DC power converter which employs a separate DC to DC converter on each phase, whose outputs are connected in parallel, to reduce harmonic currents. Unfortunately, the DC to DC converters share the DC load current without regulation. Therefore, for example, if the load was one third the maximum level, the output impedance of each DC to DC converter would have to be exactly matched to provide equal sharing. Since there cannot be an exact match because of device and manufacturing tolerances, the converter with the lowest source impedance would dominate the DC load and cause an unbalanced load at the power source. In a four wire system, the imbalance would be in the neutral wire which could cause a safety hazard by overloading the neutral wire causing excessive voltage drop or difference between adjacent equipment.

Thus, there has been a need in the art for a technique for converting alternating current to direct current at all power levels with a high power factor and minimal harmonic currents. The need is addressed by the three phase power conditioner of the present invention. The inventive power conditioner converts an alternating current input signal from a three phase source into a direct current output signal and includes a first circuit for converting a first phase of the input signal into a first direct current output signal. A second circuit is included for converting a second phase of the input signal into a second direct current output signal. Likewise, a third circuit converts a third phase of the input signal into a third direct current output signal. A control circuit regulates the power supplied by the first, second and third circuits to balance the loads for all load values dynamically. In an illustrative implementation, the first, second and third circuits are implemented with boost converters and the controller is implemented with a load share controller. The inventive power conditioner is adapted for use with Wye and Delta configured three phase power sources.

Figure 5:
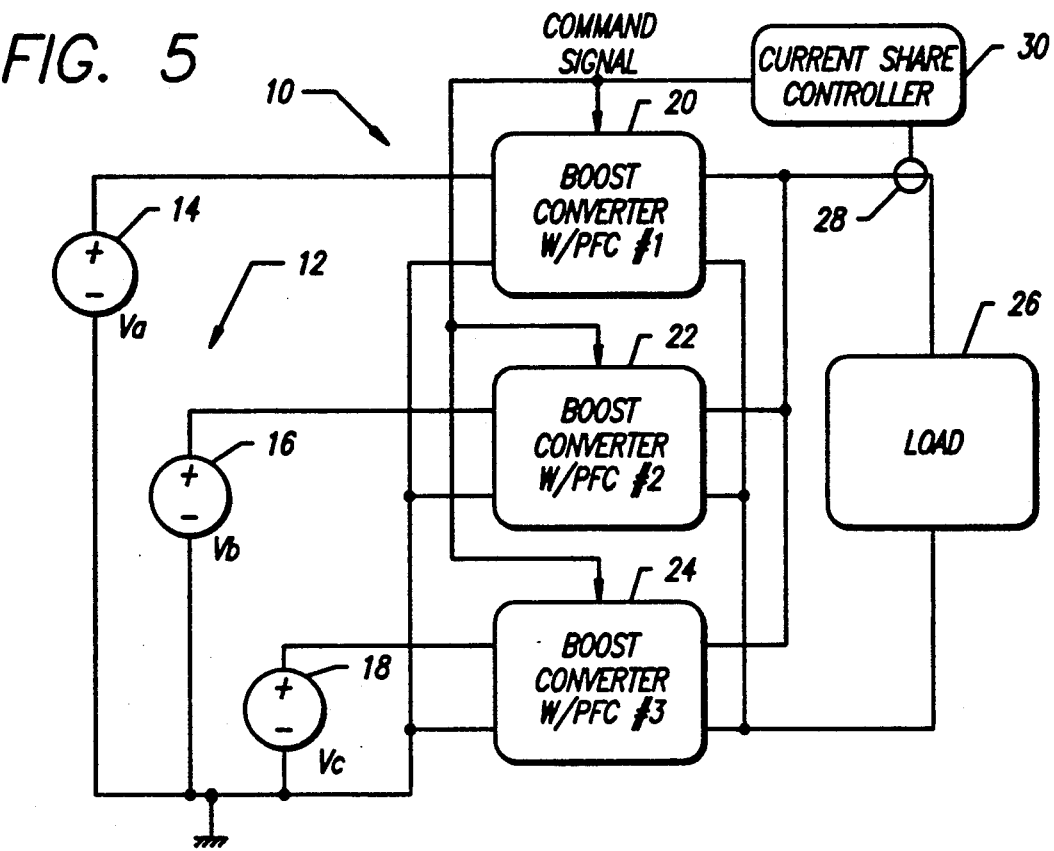
FIG. 5 is a block diagram of an illustrative implementation of the power conditioner of the present invention.

FIG. 5 is a block diagram of an illustrative implementation of the power conditioner of the present invention. The power conditioner 10 is adapted for use with a three phase power source 12 comprising first, second and third voltage sources 14, 16 and 18 respectively, connected in a Wye configuration. The power conditioner includes first, second and third boost converters with power factor control 20, 22 and 26, respectively. Those skilled in the art will appreciate that the present teachings may be used for two phase systems or extended to 4, 5 or n phase systems without departing from the scope of the invention. The first, second and third boost converters are connected to one terminal of the first, second and third voltage sources, respectively. The second terminal of each voltage source and a second input to each boost converter is connected via a neutral line to ground. Each converter provides a voltage across a load 26. Current into the load 26 is sensed by a current probe 28 (or other suitable mechanism) and input to a current share controller 30. The current share controller 30 senses the load current and provides a command signal to the boost converters to provide a proportionate share of the current required by the load.

Figure 6:
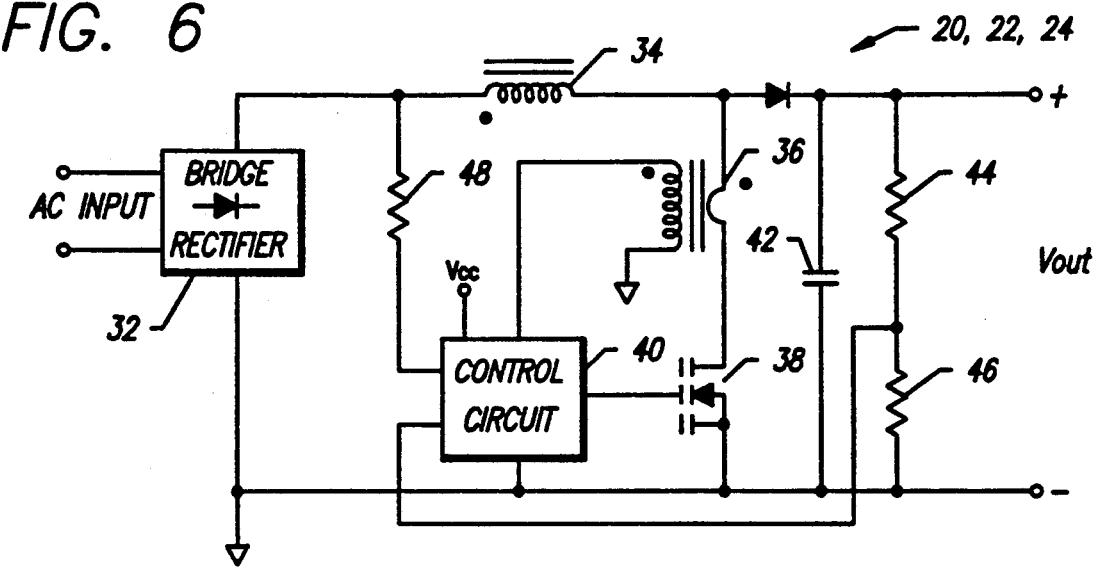
FIG. 6 is a block diagram of an illustrative implementation of the boost converter of the power conditioner of the present invention.

The boost converters may be implemented with a power factor regulator such as that shown in FIG. 6. The design for the boost converter is described in "Design of a 1kW Power Factor Correction Circuit" by M. K. Nalbant and J. Klein in *Power Conversion and Intelligent Motion*, pp. 17–24, published July 1990, the teachings of which are incorporated herein by reference. Each converter 20, 22, 24 includes a bridge rectifier 32, an inductor 34, and a capacitor 42 connected across the output terminals of the converter. A transformer 36 is connected in series with a MOSFET 38, both of which are connected in parallel with the capacitor 42. A power factor controller 40 regulates the operation of the MOSFET 38. The power factor controller 40 senses the output voltage via a voltage divider network consisting of two resistors 44 and 46 connected in series across the output terminals of the converter. The input voltage is sensed by a resistor 48 connected to the bridge rectifier 32.

Figure 7:
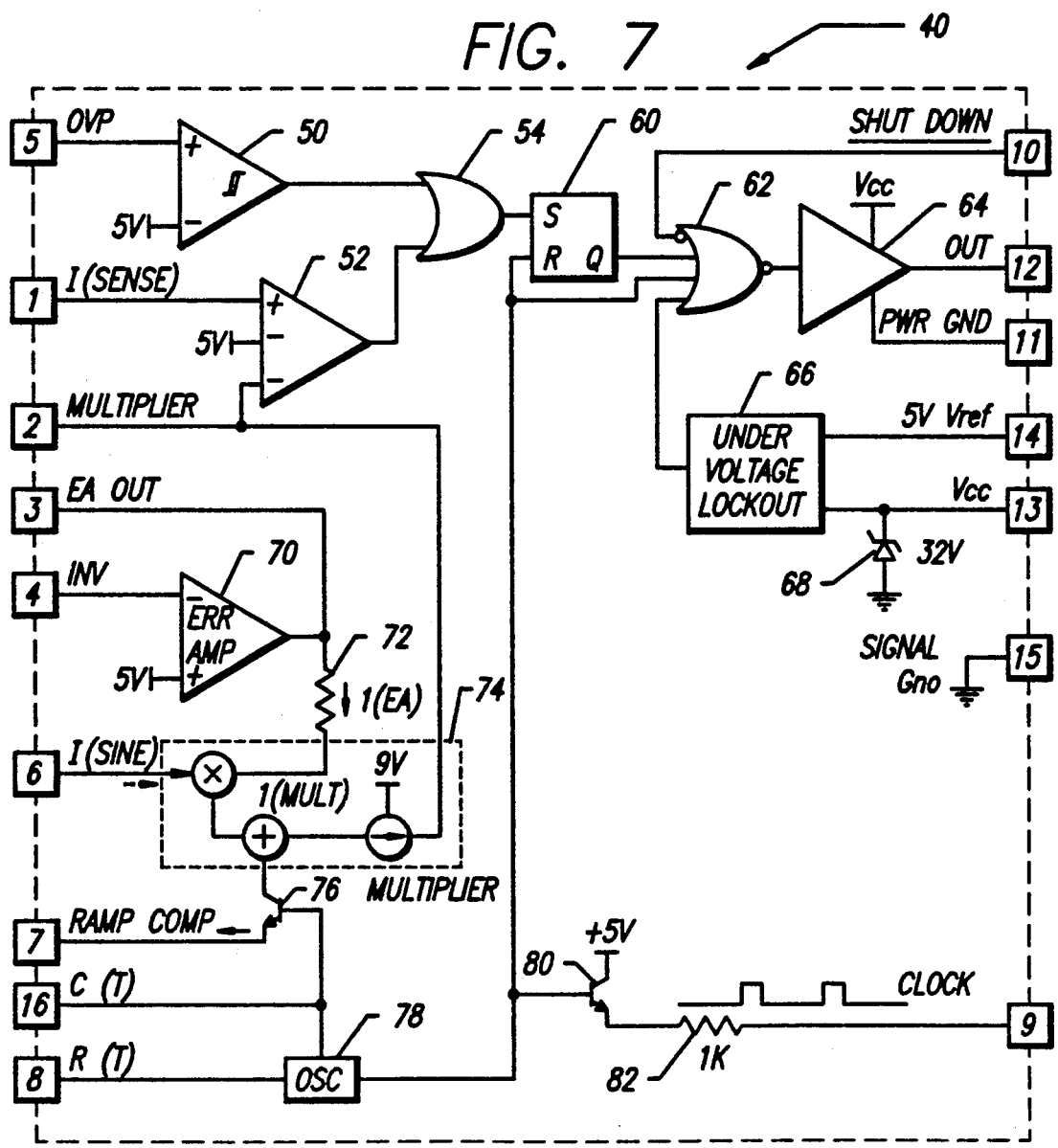
FIG. 7 is a simplified block diagram of the power factor controller utilized in the boost converter of the power conditioner of the present invention.

The power factor controller may be implemented with the ML4812 power factor controller dedicated integrated circuit by Micro Linear Corporation. FIG. 7 is a simplified block diagram of the power factor controller. The design and operation of the ML4812 chip is described in a specification provided by the Micro Linear Corporation which is incorporated herein by reference.

Figure 8:
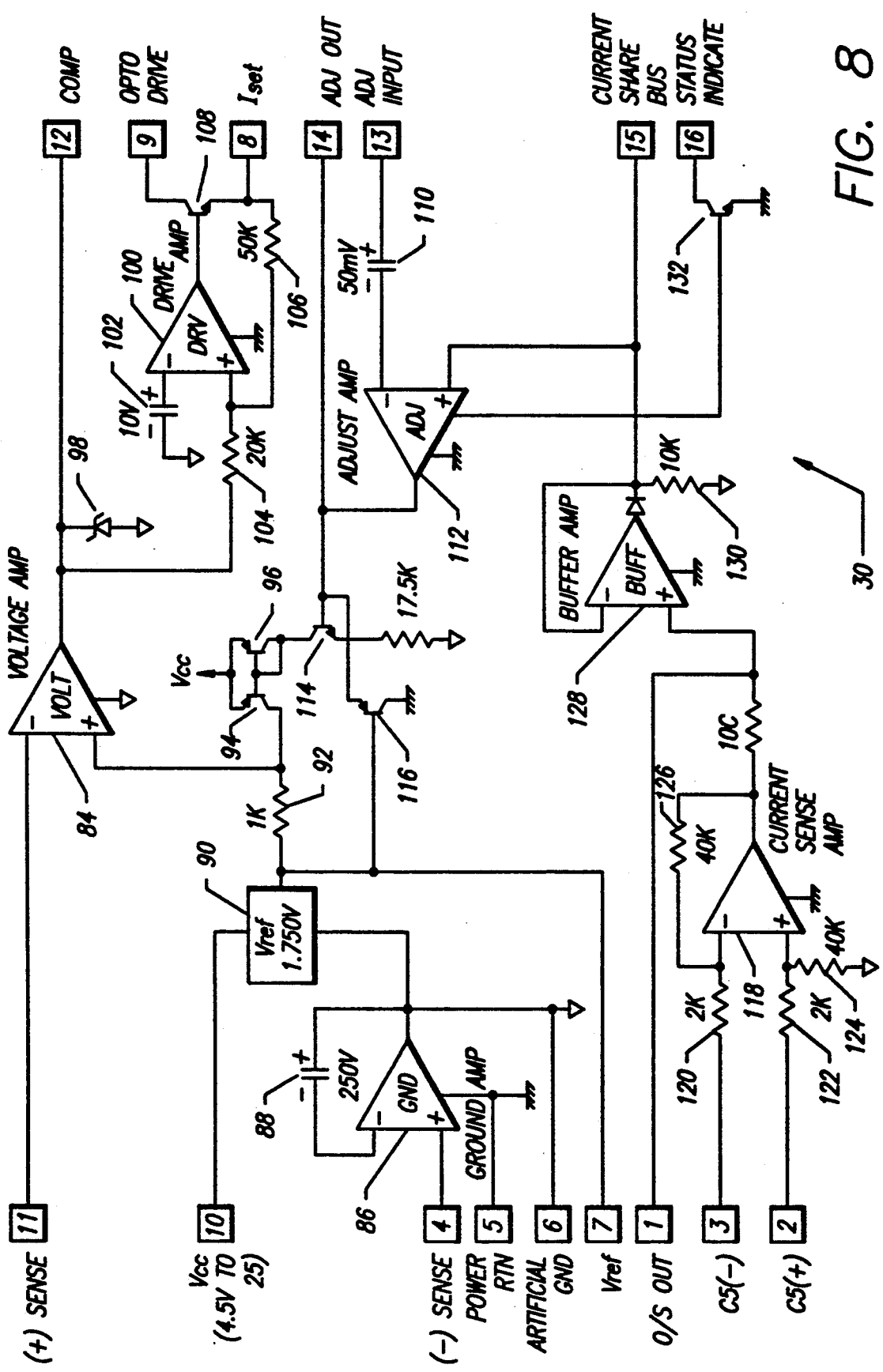
FIG. 8 is a block diagram of the load share controller utilized in the power conditioner of the present invention.

Returning to FIG. 5, a particularly novel aspect of the invention is the provision of a load share controller for sensing the load current and providing a signal to each of the boost converters to command each converter to provide a proportionate share of the current required by the load. The load share controller 30 may be implemented with a UC1907, UC2907 or UC3907 integrated circuit sold by the Unitrode Corporation. FIG. 8 is a block diagram of the illustrative implementation of the load share controller 30. The current is sensed in each phase and is compared to the current share bus. One unit is the master unit and the others are slave units. The command signal is the current share bus and the individual phase current is compared with the command signal to generate an error signal which is equal to the command minus phase current. The error signal is added into multiplier node of the ML4812 chip to compensate the maximum current allowed by that phase. The design and operation of the UC1907, UC2907 or UC3907 chips are described fully in a specification provided by the Unitrode Corporation which is incorporated herein by reference.

Figure 9:
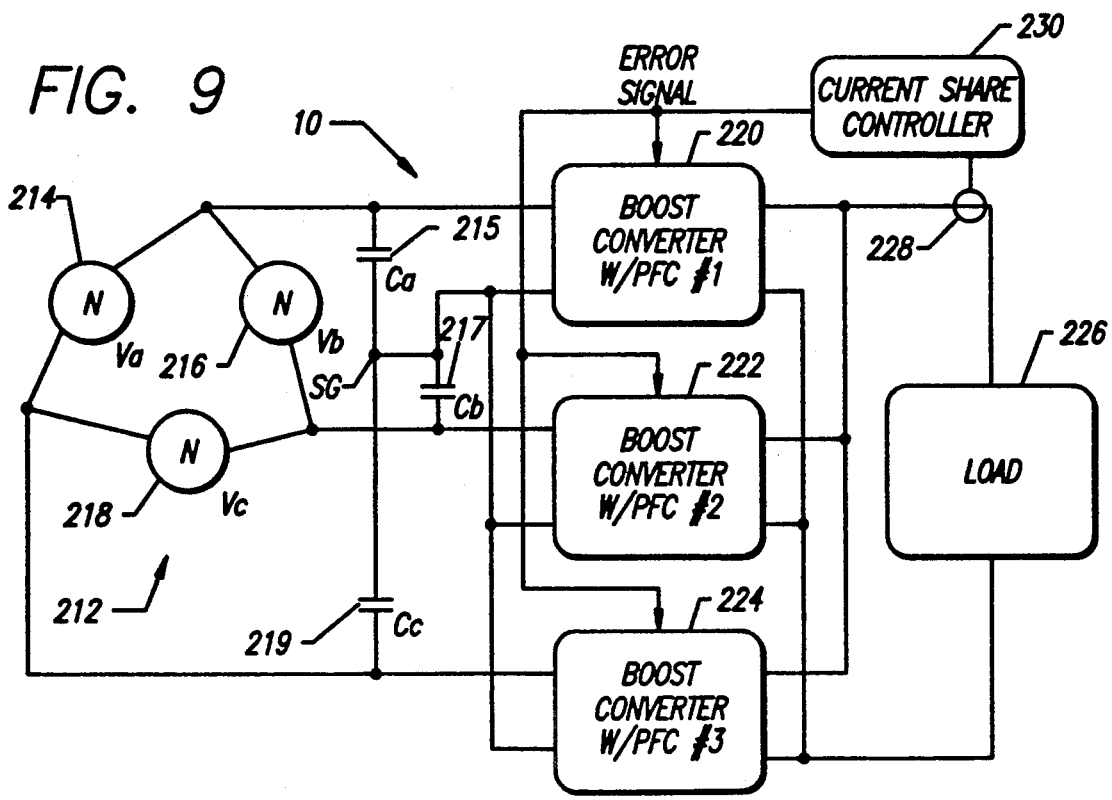
FIG. 9 is a block diagram of an alternative Delta embodiment of the power conditioner of the present invention.

FIG. 9 is a block diagram of an alternative Delta embodiment of the power conditioner of the present invention. The embodiment of FIG. 9 is similar to that of FIG. 5 with the exception that the voltage sources 214, 216 and 218 of the source 212 are configured in a three phase Delta configuration. As a result, there is no common reference for each phase as is the case with the four wire Wye configuration of FIG. 5. To use the same scheme for active power conditioning, a floating reference is provided by first, second and third capacitors 215, 217 and 219 connected in a Wye configuration. The first capacitor 215 has a first terminal connected to the node between the first and second voltage sources 214 and 216, respectively. The second capacitor 217 has a first terminal connected to the node between the second and third voltage sources 216 and 218, respectively. The third capacitor 219 has a first terminal connected to the node between the first and third voltage sources 214 and 218, respectively. The second terminals of the first, second and third capacitors are connected to a single node "SG" which constitutes a synthetic ground. The synthetic ground allows the Delta power source to drive a common power conditioner circuit. The alternative embodiment expands the teachings of the invention to three phase or n phase power systems.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A three phase power conditioned for converting an alternating current input signal from a three phase source into a direct current output signal, said source having first, second and third voltage sources connected in a Delta configuration and having first, second and third nodes therebetween, said three phase power conditioner comprising:

first means including a first boost converter for converting a first phase of said input signal into a first direct current output signal;

second means including a second boost converter for converting a second phase of said input signal into a second direct current output signal;

third means including a third boost converter for converting a third phase of said input signal into a third direct current output signal;

fourth means connected between said first, second and third means for providing an synthetic ground; and control means including a load share controller for regulating the power supplied by said first, second and third means.

2. The invention of claim 1 wherein said fourth means includes first, second and third capacitors connected at one end to the first, second and third node of the source, respectively, and to a common node at the other end.

3. A three phase power conditioner for converting an alternating current input signal from a three phase source into a direct current output signal, said source having first, second and third voltage sources connected in a Delta configuration and having first, second and third nodes therebetween, said three phase power conditioner comprising:

means for providing a synthetic ground for said source and including first, second and third capacitors connected at one end to the first, second and third nodes of the source, respectively, and to a common node at the other end;

a first boost converter connected to said first node and to said common node for converting a first phase of said input signal into a first direct current output signal;

a second boost converter connected to said second node and said common node for converting a second phase of said input signal into a second direct current output signal;

a third boost converter connected to said third node and said common node for converting a third phase of said input signal into a third direct current output signal; and control means including a load share controller for regulating the power supplied by said first, second and third boost converters.

* * * * *